United States Patent [19]
Baile et al.

[11] 3,939,275
[45] Feb. 17, 1976

[54] METHODS AND COMPOSITIONS FOR INCREASING GROWTH RATE AND FEED EFFICIENCY OF ANIMALS

[75] Inventors: Clifton A. Baile, Glen Mills; Carol Lynn McLaughlin, Malvern; Robert Lee Webb, West Chester, all of Pa.

[73] Assignee: SmithKline Corporation, Philadelphia, Pa.

[22] Filed: May 2, 1974

[21] Appl. No.: 466,425

Related U.S. Application Data

[62] Division of Ser. No. 232,241, March 6, 1972, Pat. No. 3,839,570.

[52] U.S. Cl. .............................................. 424/310
[51] Int. Cl.² ..................................... A61K 31/245
[58] Field of Search ................................... 424/310

[56] References Cited
OTHER PUBLICATIONS

Babichev — Chem. Abst. Vol. 72 (1970) p. 88728p

*Primary Examiner*—Frederick E. Waddell
*Attorney, Agent, or Firm*—Joseph A. Marlino; Richard D. Foggio; Joseph A. Marlino

[57] ABSTRACT

Methods and compositions utilizing certain local anesthetic derivatives which increase growth rate and feed efficiency of animals, particularly ruminants. The preferred compounds to be used as active ingredients are local anesthetics, such as, for example, mepivacaine hydrochloride, bupivacaine hydrochloride, tetracaine hydrochloride, and oxethazainechloro hydrochloride.

4 Claims, No Drawings

METHODS AND COMPOSITIONS FOR INCREASING GROWTH RATE AND FEED EFFICIENCY OF ANIMALS

This is a division of application Ser. No. 232,241, filed Mar. 6, 1972, now U.S. Pat. No. 3,839,570.

This invention relates to animal feed compositions and to a novel method of increasing feed efficiency and growth rate by administering these compositions. More specifically this invention relates to a method of increasing feed intake in animals by administering internally as the active ingredients local anesthetics such as mepivacaine hydrochloride, bupivacaine hydrochloride, tetracaine hydrochloride, and oxethazainechloro hydrochloride in a standard premix in the feed of the animals.

Increasing the feed intake in animals, particularly ruminants, is an important commercial objective. Sheep and cattle are fed for maximum growth rate in feed lots until they reach a marketable weight. When the desired weight is achieved, the animal is sold for slaughter. There is a normal feed intake for most animals due to both physical and metabolic factors. Presumably, animals become satiated and therefore will no longer feed voluntarily.

It has been unexpectedly found that when certain local anesthetic derivatives are administered to animals, they ear more and gain weight at a faster rate resulting in better efficiency.

The compositions and methods of this invention definitely benefit the economics of animal production by inducing the animals to eat more than their normal feed intake. The animals eat more, gain weight more rapidly, and get to market faster resulting in a saving of feed cost and labor.

The increased feed intake and weight gain of animals is accomplished in accordance with this invention by a method which comprises administering internally to the animal compounds of the following basic structural formulas:
in which R represents a lower alkyl having up to four carbons.

In Formula I when R is methyl, the compound is known generically as mepivacaine. When R is butyl the compound is bupivacaine. Generically Formula II is known as tetracaine and Formula III as oxethazaine.

The above compounds of Formulas I, II, and III, which are the active ingredients in the claimed methods and compositions for increasing feed intake and efficiency, are known or prepared by synthetic methods familiar to the art, as for example, those set forth in British Pat. No. 869,978 and U.S. Pat. Nos. 2,799,679, 1,889,645, and 2,780,646.

The compounds set forth by the above Formulas can be mixed with conventional animal feed compositions by incorporating them in feed or feed premix formulations in effective but nontoxic quantities which increase animal feed intake and efficiency. The feed compositions are then fed to animals, preferably ruminants, according to methods well known to the agricultural art.

The animal feeds most generally used in conjunction with the method of this invention are either various grain mixtures and/or roughage feeds such as hay commonly fed to runinant animals such as cattle or sheep. The amount of additive used to supplement such feeds will be an amount sufficient to increase growth rate and/or improve the feed efficiency of the animal but not to have a toxic or noxious effect; in the broad range of from about 10 g. to 675 g. per ton of feed, preferably from about 25 g. to 400 g. per ton. An average sheep will ingest about 3–4 lbs. of feed daily; an average feed lot steer about 20–25 lbs. Therefore the preferable broad range of dosage for ruminants by any method of internal administration is approximately 25 mg. to 5 g. per day.

For commercial use, the active ingredients can be readily used as premix formulations in which the chemical is distributed uniformly throughout a standard animal feed carrier. This premix or concentrate is then mixed with a normal diet for the animal desired. Examples of such carriers are soybean meal, corn oil, ground corn, barley, wheat, mineral mixtures such as vermiculite, diatomaceous earth, corn gluten meal, corn distillers solubles or soyflour. The active ingredient will be in amounts to satisfy the criteria set forth above for whole feed. The active ingredient will usually be present in from about 1–75% by weight of the premix composition.

The animal feeds themselves may also contain: roughages such as cellulose, hay, straw, silages, corn stalks, cotton seed hulls, oats, barley and cereal brans; natural oils such as animal fats, fish oils, safflower oil, peanut oil and cottonseed oil; antioxidants, minerals, vitamins, antibiotics, anthelmintics; and other appro- Formula I

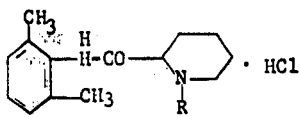

Formula II

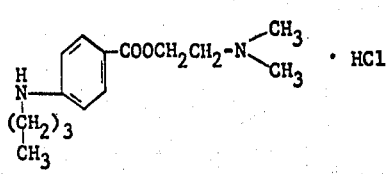

Formula III

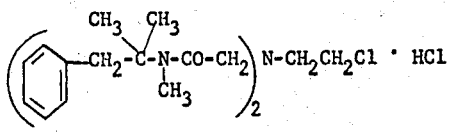

priate medicaments.

Examples of typical prepared animal feed is as follows:

EXAMPLE 1

| Ingredient | Weight per cent |
|---|---|
| Mixed hay | 40.0 |
| Ground yellow corn | 45.0 |
| Soybean oil meal | 7.0 |
| Cane molasses | 7.0 |
| Dicalcium phosphate | 0.5 |
| Trace minerals salt | .5 |
| Vitamin A | 300 I.U./lb. |
| Vitamin D. | 150 I.U./lb. |
| Mepivacaine Hydrochloride | 0.4 lb./ton of feed |

EXAMPLE 2

An example of a suitable premix is as follows:

| | |
|---|---|
| Bupivacaine | 1 lb. |
| Ground yellow corn | to 10 lbs. |

EXAMPLE 3

In the field the active ingredients may be administered by means of salt or molasses blocks. A typical block may be prepared using the following conditions:

| Ingredients | Weight per cent |
|---|---|
| Dried cane molasses | 44.54 |
| Ground soybean hulls | 24.90 |
| Tetracaine hydrochloride | 5.00 |
| Granulated salt | 21.59 |
| Trace minerals and vitamins | 0.20 |
| Stabilized animal fat | 1.11 |
| Moisture | 2.66 |

EXAMPLE 4

Cattle Diet

| Ingredients | Weight per cent |
|---|---|
| Ground shelled corn | 65.85 |
| Mixed ground hay | 20.00 |
| Dried molasses | 6.00 |
| Soybean meal | 6.00 |
| Mepivacaine hydrochloride | 1.4 lb./ton feed |
| Urea | .55 |
| Trace mineral salt | .50 |
| Dicalcium phosphate | .40 |
| Ground limestone | .70 |
| Vitamin A (30,000 units/gm.) | 66.7 gm./ton |
| Vitamin D$_2$ (16,000,000 units/lb.) | 7.1 gm./ton |

The method of this invention comprises allowing the cattle or sheep to graze or be fed ad libitum on the supplemented rations or to be fed on a regular schedule.

The ability of the local anesthetic derivatives of this invention to increase feed intake of animals has been established by the following tests:

Feed intakes of eight sheep were measured for 6 days. During days 1, 2, 5, and 6 a basic diet was fed and during days 3 and 4 a local anesthetic was added to the same basic diet. The 2-day average daily feed intake during the treatment period (days 3 and 4) and during the post-treatment period (days 5 and 6) was compared to that during the pretreatment control period (days 1 and 2). Several levels of each local anesthetic were tested.

Table 1 represents the results of these tests performed with the local anesthetics mepivacaine, bupivacaine, tetracaine, and oxethazainechloro hydrochlorides as the active ingredients.

TABLE 1

| Local Anesthetic | Dose Level (g/kg of Feed) | % of Pretreatment Control (Feed Intake) Treatment | Post-Treatment |
|---|---|---|---|
| Mepivacaine HCl | .21 | 104 | 92 |
| Mepivacaine HCl | .42 | 107 | 93 |
| Mepivacaine HCl | .83 | 111 | 98 |
| Mepivacaine HCl | 1.20 | 111 | 90 |
| Mepivacaine HCl | 1.60 | 114 | 96 |
| Mepivacaine HCl | 3.20 | 110 | 106 |
| Bupivacaine HCl | .25 | 104 | |
| Bupivacaine HCl | .50 | 111 | 99 |
| Bupivacaine HCl | .80 | 112 | 101 |
| Tetracaine HCl | .15 | 106 | 102 |
| Tetracaine HCl | .25 | 111 | 107 |
| Tetracaine HCl | .375 | 104 | 105 |
| Tetracaine HCl | .50 | 100 | 96 |
| Oxethazainechloro HCl | .40 | 107 | 103 |
| Oxethazainechloro HCl | .60 | 105 | 90 |

These results clearly indicate that sheep eat significantly more feed after being administered the local anesthetics mepivacaine, bupivacaine, tetracaine, and oxethazainechloro hydrochlorides.

To test the long term effect of mepivacaine hydrochloride on growing lambs, 28 sheep were randomly assigned to one of four groups after a 2-week pretreatment period during which they received a basic meal feed. During a 5-week treatment period, one group continued to receive the basic meal feed, one group received 400 mg. mepivacaine/kg. of the basic feed, one group received 700 mg. mepivacaine/kg. of the basic feed, and the last group received 1,000 mg. carbocaine/kg. of the basic feed. During the last 2 weeks (recovery period), all groups received the basic feed. Animals were weighed at the beginning of the experiment and every seventh day thereafter. Table 2 shows the group average daily feed intake during each period, and in Table 3 the average daily weight gains and feed efficiencies are disclosed for the 5-week period.

TABLE 2

| Group | Group Average Daily Feed Intakes (Gms./Day) | | |
|---|---|---|---|
| | Pretreatment | Treatment | Recovery |
| Control | 1172 | 1199 | 1005 |
| 400 mg/kg | 1142 | 1291 | 1247 |
| 700 mg/kg | 1121 | 1113 | 996 |
| 1000 mg/kg | 1183 | 1162 | 1072 |

TABLE 3

| Group | Group Average Daily Weight Gains (kg) and Feed Efficiencies | |
|---|---|---|
| | Weight Gain (kg) | Feed Efficiency (kg Feed/kg Weight Gain) |
| Control | 0.14 | 8.56 |
| 400 mg/kg | 0.17 | 7.53 |
| 700 mg/kg | 0.13 | 8.47 |
| 1000 mg/kg | 0.14 | 8.13 |

To test the long-term effect of mepivacaine hydrochloride on feed intake, 28 mature sheep were divided into four groups matched for weight. For 17 days all sheep received a basic meal diet (pretreatment); for the following 17 days one group continued to receive this diet. One group received 167 mg. mepivacaine/kg. of this diet, one group received 333 mg. mepivacaine/kg. of this diet, and the last group received 667 mg. mepivacaine/kg. of this diet. This treatment period was followed by a 17-day recovery period during which all groups received the basic meal diet. Daily feed intakes were measured and all animals were weighed weekly and at the beginning and end of each period. Each 17-day period was divided into three sections of 6, 5, and 6 days respectively, and average feed intakes/kg. weight are presented in Table 4. The group receiving the highest dose ate more for the 17-day test period.

TABLE 4

| Group | Group Average Feed Intakes Gms./kg. Body Weight | | |
|---|---|---|---|
| | 6 days | 5 days | 6 days |
| Control | 31.7 | 31.6 | 29.1 |
| 167 mg/kg | 30.7 | 30.7 | 30.3 |
| 333 mg/kg | 31.1 | 31.1 | 29.9 |
| 667 mg/kg | 33.5 | 33.9 | 34.0 |

These results further indicate that mepivacaine hydrochloride has a sustained effect on feed intake and results in improved rates of gain and feed efficiency.

What is claimed is:

1. The method of increasing growth rate and feed efficiency of ruminant animals comprising administering orally to said animals an effective but nontoxic quantity of a local anesthetic having the following formula:

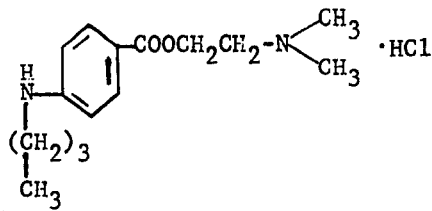

2. The method of claim 1 in which the compound is present in feed compositions in an amount of from about 10 g. to 675 g. per ton of feed.

3. The method of claim 1 in which the compound is present in feed compositions in an amount of from 25 g. to about 400 g. per ton of feed.

4. The method of clam 1 in which the quantity of local anesthetic administered is from about 25 mg. to about 5 g. per animal per day.

* * * * *